(12) United States Patent
Balaji et al.

(10) Patent No.: US 10,044,395 B2
(45) Date of Patent: *Aug. 7, 2018

(54) FEATURES AND MANUFACTURING METHODS FOR A CASE FOR A PORTABLE ELECTRONIC DEVICE

(71) Applicant: Apple Inc., Cupertino, CA (US)

(72) Inventors: Santhana Krishnan Balaji, Cupertino, CA (US); Amy Qian, Sunnyvale, CA (US); Pinida J. Moolsintong, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,262

(22) Filed: Sep. 23, 2016

(65) Prior Publication Data

US 2017/0012662 A1    Jan. 12, 2017

Related U.S. Application Data

(63) Continuation of application No. 14/258,951, filed on Apr. 22, 2014, now Pat. No. 9,485,338.

(Continued)

(51) Int. Cl.
*H04B 1/3888* (2015.01)
*G06F 1/16* (2006.01)
(Continued)

(52) U.S. Cl.
CPC ............ *H04B 1/3888* (2013.01); *A45C 11/00* (2013.01); *B26D 3/281* (2013.01); *G06F 1/1626* (2013.01);
(Continued)

(58) Field of Classification Search
CPC ................ H04B 1/3888; G06F 1/1626; G06F 2200/1633; B26D 3/281; A45C 11/00;
(Continued)

(56) References Cited

U.S. PATENT DOCUMENTS

| 4,259,568 A | 3/1981 | Dynesen |
| D623,638 S | 9/2010 | Richardson et al. |

(Continued)

FOREIGN PATENT DOCUMENTS

| CN | 102215714 A | 10/2011 |
| CN | 202306564 U | 7/2012 |

(Continued)

OTHER PUBLICATIONS

Chinese Patent Application No. 201480002251.1—First Office Action dated Sep. 21, 2015.

(Continued)

*Primary Examiner* — Brandon J Miller
(74) *Attorney, Agent, or Firm* — Dickinson Wright RLLP

(57) ABSTRACT

An accessory unit for use with an electronic device is described. Accessory unit includes a front flap and a rear cover. The rear cover includes a recessed portion that defines a chamber and a lip portion. The chamber is configured to receive a consumer electronic device, and the lip portion is configured to hold the consumer electronic device therein by an interference fit that exposes substantially all of a display portion of the consumer electronic product. The front flap can include segments formed from panels with folding regions therebetween, which allow the front flap to fold. Further, an end region of the front flap pivotally couples the front flap to the rear cover, such that the front flap may be moved between open and closed configurations. The front may include magnetic elements.

20 Claims, 11 Drawing Sheets

Related U.S. Application Data

(60) Provisional application No. 61/873,748, filed on Sep. 4, 2013.

(51) Int. Cl.
  *B26D 3/28* (2006.01)
  *A45C 11/00* (2006.01)
  *H04M 1/04* (2006.01)
  *H04M 1/02* (2006.01)

(52) U.S. Cl.
  CPC ......... *H04M 1/04* (2013.01); *A45C 2011/002* (2013.01); *A45C 2011/003* (2013.01); *G06F 2200/1633* (2013.01); *H04M 1/0216* (2013.01); *Y10T 83/02* (2015.04); *Y10T 83/04* (2015.04); *Y10T 83/0448* (2015.04); *Y10T 156/10* (2015.01); *Y10T 156/108* (2015.01)

(58) Field of Classification Search
  CPC ....... A45C 2011/002; A45C 2011/003; H04M 1/04; H04M 1/0216; Y10T 156/10; Y10T 156/108; Y10T 83/02; Y10T 83/0445; Y10T 83/04
  See application file for complete search history.

(56) References Cited

U.S. PATENT DOCUMENTS

| | | | |
|---|---|---|---|
| 8,143,982 B1 | 3/2012 | Lauder et al. | |
| 8,167,126 B2 | 5/2012 | Stiehl | |
| 8,253,518 B2 | 8/2012 | Lauder et al. | |
| 8,474,609 B1 | 7/2013 | Hong et al. | |
| D688,251 S | 8/2013 | Akana et al. | |
| 8,616,422 B2 | 12/2013 | Adelman et al. | |
| 8,704,647 B2 | 4/2014 | Kyung et al. | |
| 8,774,446 B2 | 7/2014 | Merenda | |
| 8,807,333 B1 | 8/2014 | Cooper et al. | |
| 8,878,637 B2* | 11/2014 | Sartee .................. G06F 1/16 206/320 |
| 8,887,903 B2 | 11/2014 | Diebel et al. | |
| 8,887,909 B2 | 11/2014 | McCarthy et al. | |
| 9,000,871 B2* | 4/2015 | Cencioni ............... G06F 1/1626 206/45.2 |
| 9,008,738 B1 | 4/2015 | Dong | |
| 9,072,352 B2* | 7/2015 | Sartee .................. G06F 1/16 |
| 9,226,559 B1* | 1/2016 | Diebel ................... A45C 11/00 |
| 9,315,004 B2* | 4/2016 | Balaji ................... B32B 37/12 |
| 9,335,793 B2* | 5/2016 | Rothkopf ............. A45C 13/002 |
| 9,419,669 B2* | 8/2016 | Smith ................... A45C 5/02 |
| 9,485,338 B2* | 11/2016 | Balaji ................... H04M 1/04 |
| 2011/0073505 A1* | 3/2011 | Stiehl .................... G06F 1/1656 206/320 |
| 2011/0163642 A1 | 7/2011 | Rohrbach et al. | |
| 2011/0290687 A1 | 12/2011 | Han | |
| 2011/0297566 A1 | 12/2011 | Gallagher et al. | |
| 2011/0297581 A1 | 12/2011 | Angel | |
| 2012/0008269 A1 | 1/2012 | Gengler | |
| 2012/0037523 A1 | 2/2012 | Diebel et al. | |
| 2012/0044638 A1 | 2/2012 | Mongan et al. | |
| 2012/0085679 A1 | 4/2012 | Kim et al. | |
| 2012/0088557 A1* | 4/2012 | Liang .................... G06F 1/1628 455/575.1 |
| 2012/0194448 A1 | 8/2012 | Rothkopf | |
| 2012/0205277 A1 | 8/2012 | Chang | |
| 2012/0217174 A1 | 8/2012 | Ting | |
| 2012/0268891 A1 | 10/2012 | Cencioni | |
| 2012/0298536 A1* | 11/2012 | Rauta ................... G06F 1/1656 206/301 |
| 2012/0325838 A1 | 12/2012 | Huang | |
| 2013/0020214 A1 | 1/2013 | Chiou | |
| 2013/0032617 A1* | 2/2013 | Adelman .............. A45F 5/00 224/191 |
| 2013/0042581 A1 | 2/2013 | Holben et al. | |
| 2013/0095898 A1 | 4/2013 | Altschul et al. | |
| 2013/0098782 A1 | 4/2013 | Diebel et al. | |
| 2013/0109435 A1* | 5/2013 | McCaughey .......... H01Q 1/243 455/556.1 |
| 2013/0137327 A1 | 5/2013 | Tseng | |
| 2013/0147330 A1 | 6/2013 | DiFonzo et al. | |
| 2013/0175186 A1 | 7/2013 | Simmer | |
| 2013/0241381 A1 | 9/2013 | Hynecek et al. | |
| 2013/0277271 A1 | 10/2013 | Toulotte | |
| 2014/0076753 A1 | 3/2014 | Limber et al. | |
| 2015/0263776 A1 | 9/2015 | Shyu et al. | |
| 2015/0295615 A1 | 10/2015 | Smith et al. | |
| 2016/0224238 A1* | 8/2016 | Rothkopf ............. A45C 13/002 |
| 2016/0336988 A1 | 11/2016 | Smith et al. | |
| 2017/0005689 A1 | 1/2017 | Smith et al. | |

FOREIGN PATENT DOCUMENTS

| | | |
|---|---|---|
| CN | 202774742 U | 3/2013 |
| EP | 2521468 A1 | 11/2012 |
| FR | 2968900 A1 | 6/2012 |
| JP | 2002142835 A | 5/2002 |
| JP | 3174584 U | 3/2012 |
| JP | 3178107 U | 8/2012 |
| JP | 2013516272 A | 5/2013 |
| KR | 101188978 B1 | 10/2012 |
| WO | 2011084181 A1 | 7/2011 |
| WO | 2013043465 A1 | 3/2013 |
| WO | 2013106375 A1 | 7/2013 |

OTHER PUBLICATIONS

International Search Report and Written Opinion for PCT Application No. PCT/US2014/52869 dated Dec. 3, 2014.
European Patent Application No. 14838829—Supplementary Partial Search Report dated May 11, 2016.
Chinese Patent Application No. 201480002251.1—Second Office Action dated May 18, 2016.
Australian Patent Application No. 2014315541—Examination Report No. 1 dated Nov. 15, 2016.
Japanese Patent Application No. 2016-540278—Office Action dated Apr. 28, 2017.
Australian Patent Application No. 2014315541—Examination report No. 2 dated Jun. 7, 2017.
European Patent Application No. 17184966.4—Extended European Search Report dated May 3, 2018.
Chinese Application for Invention No. 201610936626.2—First Office Action dated May 16, 2018.

\* cited by examiner

FEATURES AND MANUFACTURING METHODS FOR A CASE FOR A PORTABLE ELECTRONIC DEVICE

CROSS-REFERENCE TO RELATED APPLICATION(S)

This application is a continuation of U.S. application Ser. No. 14/258,951, filed Apr. 22, 2014, of the same title, now U.S. Pat. No. 9,485,338 issued Nov. 1, 2016, which claims the benefit of U.S. Provisional Application No. 61/873,748, filed on Sep. 4, 2013, of the same title, the contents of which are incorporated herein by reference in their entirety for all purposes.

FIELD

The present disclosure relates generally to accessory units, and more particularly to accessory units for consumer electronic devices and related assemblies and methods.

BACKGROUND

As advancements are made in the field of consumer electronic devices, development of associated accessory units also occurs. In this regard, some accessory units such as cases are designed to protect consumer electronic devices. Other accessory units are configured to provide consumer electronic devices with increased functionality. While existing accessory units may function suitably for their intended purposes, further advancements may be desirable. For example, increased functionality or protection for the associated consumer electronic devices may be desirable.

Accordingly, a need for continued advancement in the field of accessory units may exist.

SUMMARY

In one aspect, a case for a portable electronic device having a housing and a display assembly carried by the housing is described. The case may include a recessed portion and a lip portion. The recessed portion may include a side wall. The lip portion may be integrally formed with the recessed portion. The recessed portion and the lip portion may cooperate to define a chamber. The lip portion may further include a resilient material and be configured to retain the portable electronic device within the chamber. The lip portion may further include an edge having a shape that defines an opening suitable for receiving the portable electronic device. While receiving of the portable electronic device into the chamber, the edge may directly engage the housing. The sidewall and the lip portion may cooperate to provide an affirmative feedback indicating that the portable electronic device is fully secured within the chamber.

In another aspect, a method of forming a rear cover configured to receive an electronic device is described. The method may include applying an adhesive to an inner portion of a shell and an outer portion of the shell. The shell may include a lip portion, and the shell may be configured to receive the electronic device. The method further includes applying a first layer to a central portion disposed on the inner portion of the shell. The first layer may be configured to engage the inner portion and the lip portion. The first layer may also include an outer peripheral region. The method further includes expanding the inner layer toward an inner surface of the shell. The inner surface extends around a perimeter of the shell. The method may further include applying a second layer to the outer portion of the shell. The second layer may include an outer peripheral region, and may be configured to engage the lip portion and the outer portion. The outer peripheral region of the second layer may be configured to engage the outer peripheral region of the inner portion. The method may further comprise curing the adhesive.

In another aspect, a method of forming a front cover for an electronic device is described. The may include providing a fabric layer having a top surface and a bottom surface opposite the top surface. The fabric layer may also include a first thickness measuring from a vertical distance between the top surface and the bottom surface. The method may further include positioning the fabric layer such that the fabric layer includes a first elevated portion and a second elevated portion. A non-elevated portion of the fabric layer may extend between the first elevated portion and the second elevated portion. The method may further include applying a first cut on the top surface at the first elevated portion thereby forming a first cut portion. The method may further include removing the first elevated portion.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Exemplary applications of apparatuses, assemblies, systems, and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

Accessory units are commonly used in conjunction with consumer electronic devices. Some accessory units are configured to protect consumer electronic devices. For example, cases may be employed to partially or fully surround a consumer electronic device such that the consumer electronic device is protected from damage. By way of further example, stands for consumer electronic devices may be configured to prop up the consumer electronic devices such that they may be conveniently positioned for interaction therewith. Another accessory unit can take the form of a foldable cover that can be detachably connected to, for example, a tablet computer, and have a protective flap. An example of such is that of the SMART COVER®, which is produced by Apple, Inc. of Cupertino, Calif. This product is moveable between multiple configurations, including one configuration in which it functions as a cover and another configuration in which it functions as a stand. While the SMART COVER® and other accessory units may perform in accordance with their intended purposes, additional advancements in accessory units may be desirable.

These and other embodiments are discussed below with reference to FIGS. 1A-7. However, those skilled in the art will readily appreciate that the detailed description given herein with respect to these figures is for explanatory purposes only and should not be construed as limiting. For the remainder of this discussion, an accessory unit suitable for use with an electronic device will be described. In particular, for simplicity and clarity, for the remainder of this discussion, the electronic device takes the form of a handheld electronic device such as a tablet computer.

Figure 1A:
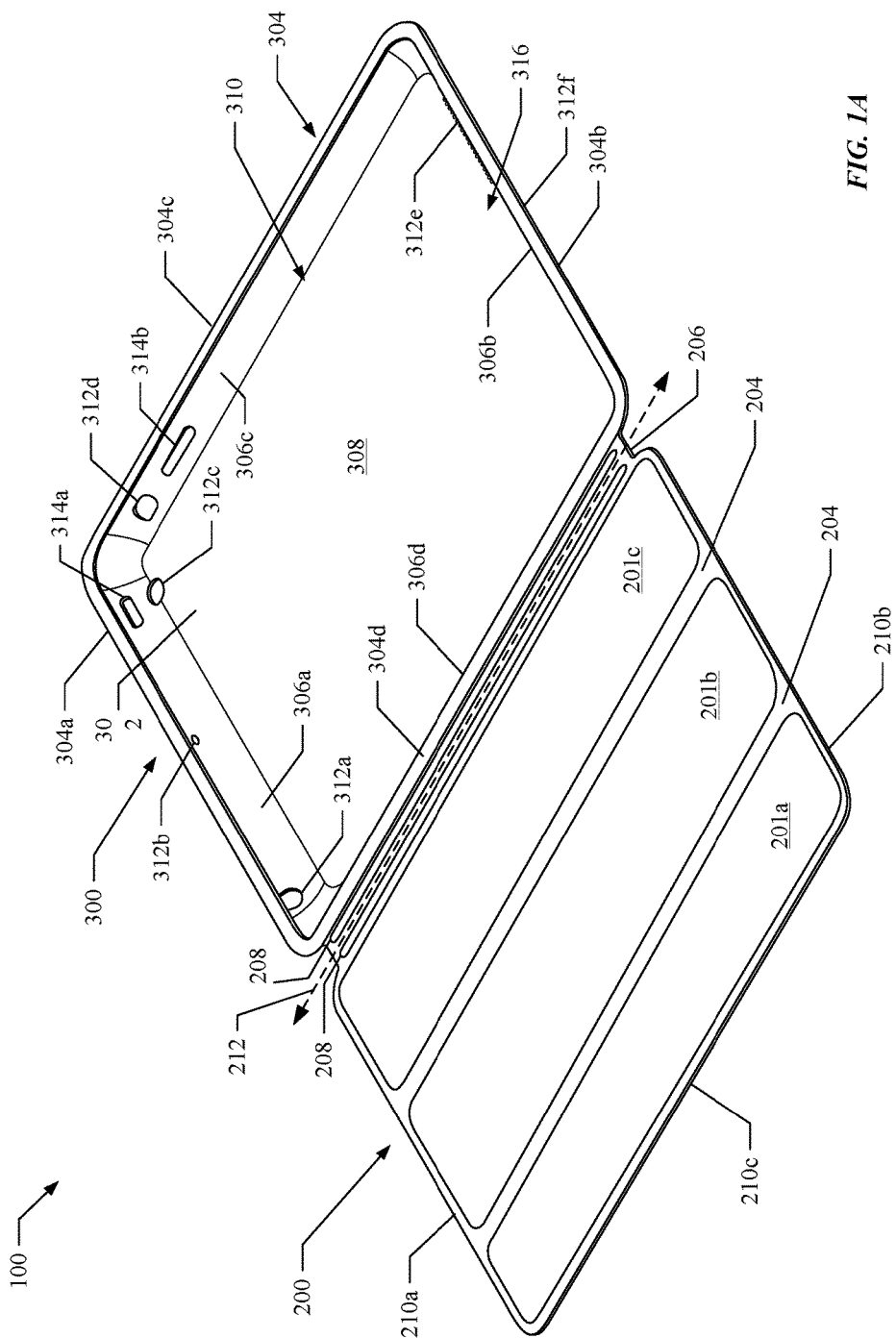
FIG. 1A illustrates a perspective view of an accessory unit comprising a front flap and a rear cover wherein the front flap is in an open configuration according to an example embodiment of the disclosure.
Figure 1B:
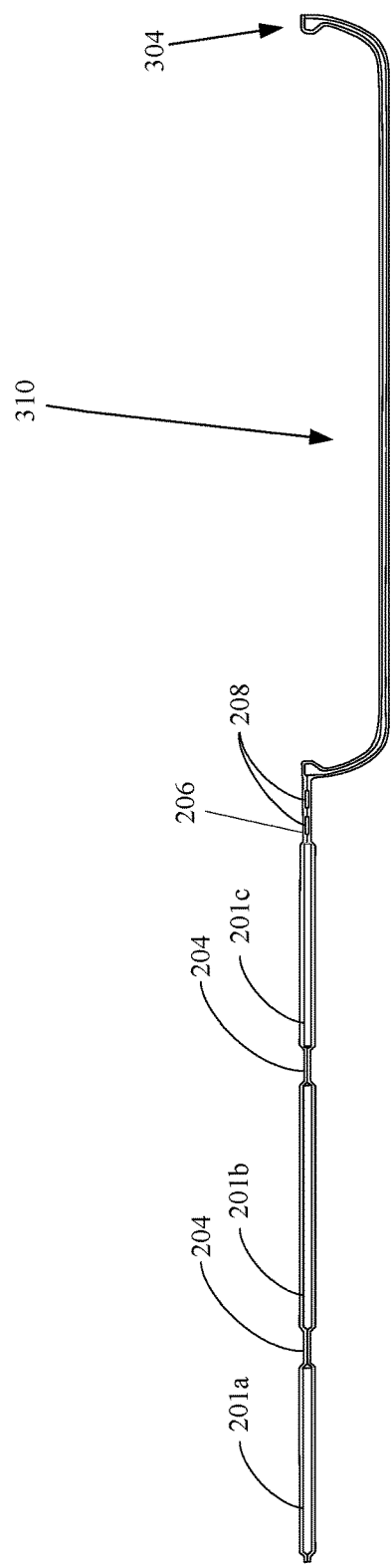
FIG. 1B illustrates a cross sectional view of the accessory unit shown in FIG. 1A in the open configuration.

In this regard, FIGS. 1A-1B illustrate an embodiment of an accessory unit 100 according to the present disclosure. As illustrated, the accessory unit 100 may comprise a front flap 200 and a rear cover 300. The front flap 200 may include a plurality of segments 201a, 201b, 201c and a folding region 204 positioned between each of the segments. The folding regions 204 may be configured to allow segments 201a, 201b, and 201c to fold with respect to each other. The front flap 200 may also include an end region 206. The end region 206 pivotally couples the front flap 200 to the rear cover 300.

In some embodiments, each of segments 201a, 201b, 201c can include one or more inserts disposed therein. For example, segments 201a, 201b, 201c can each include a pocket region where the inserts are placed, or alternatively, may be embedded within segments 201a, 201b, 201c (e.g., via insert molding). In embodiments using pockets, the pocket regions have a size and shape to accommodate corresponding inserts. The inserts can have various shapes but are usually shaped to correspond to the overall look of front flap 200 (e.g., rectangular). The inserts can provide structural support for front flap 200. That is, the inserts can provide stiffness to the cover assembly. Accordingly, the inserts may be referred to as stiffeners. The inserts can be formed of rigid or semi-rigid material adding resiliency to front flap 200. Examples of materials that can be used include plastics, fiber glass, carbon fiber composites, metals, and the like. Some inserts can be formed of resilient materials that further accommodate other components such as magnetic elements. Magnetic elements can interact with a magnetic sensor disposed within an electronic device (not shown) associated with accessory unit 100. Magnetic elements also be arranged to form a magnetic attraction with an attractable magnetic element disposed with at least one insert. In some embodiment, attractable magnetic elements can be formed of steel, or other ferromagnetic material, and take the shape of a thin sheet incorporated within an insert.

Front flap 200 further includes folding regions 204 that are thinner segments 201a, 201b, 201c and do not include the inserts thereby allowing front flap 200 to fold and make front flap 200 easier to handle. In one embodiment, segments 201b, and 201c can be substantially wider than segment 201a in size. In this way, a triangular support structure having appropriate angles can be formed by positioning segments 201a, 201b, 201c in a manner described in U.S. Patent Application entitled, "CONSUMER ELECTRONIC PRODUCT" by Lauder et al. filed Dec. 17, 2010, having application Ser. No. 12/971,536, now U.S. Pat. No. 8,344,836, which is incorporated herein by reference in its entirety.

One approach to forming at least one triangular support structure can include segment 201a having a plurality of magnets and arranged to fold with respect to segments 201b and 201c in such a way that at least one magnetic element within segment 201a is magnetically attracted to a magnetically active element within segment 201c. In this way, segments 201a and segment 201c can be magnetically bound together forming a first triangular support structure. The triangular support structure can be used as a support structure for accessory unit 100. Accordingly, any electronic component supported by accessory unit 100 can also be supported. For example, when used as a support, an electronic device having a display and supported by accessory unit 100 can be placed in such a way that visual content can be displayed at about 75 degrees in relation to a horizontal surface below accessory unit 100. In another example, front flap 200 can be folded to form a second triangular support structure that can be used to position the electronic device in an orientation suitable for using the electronic device as a keyboard. It should be noted, however, that these are only representative examples of many other support structures that can be formed by front flap 200.

While the flexible material of end region 206 allows it to pivotally couple front flap 200 to rear cover 300, this may also cause misalignment between front flap 200 and rear cover 300 in a closed configuration. As shown in FIG. 2B, a closed configuration refers to front flap 200 being substantially in contact with rear cover 300. To ensure proper alignment between front flap 200 and rear cover 300 in a closed configuration, some embodiments include end panels 208 in end region 206. End panels 208 may be configured to strengthen the end region 206 such that the end region 206 maintains alignment of outer edges 210a-c (collectively, "210") of the front flap 200 with respect to the lip portion 304 of the rear cover 300. End panels 208 could be made of fiberglass, steel, carbon fiber, plastic, or combination thereof. In some embodiments, end panels 208 can have a thickness that prevents them from showing through to a cosmetic surface of accessory unit 100. In this way, end panels 208 can provide rigidity for the pivotal coupling between front flap 200 and rear cover 300 such that front flap 200 pivots about a longitudinal axis 212 without affecting a cosmetic appearance of accessory unit 100.

The rear cover 300 can include a recessed portion 302, also referred to as a bucket, and a lip portion 304. The recessed portion 302 may include a plurality of sidewalls 306a-d (collectively, "306") and a bottom wall 308 that define a chamber 310. The recessed portion 302 may include one or more apertures 312*a-e* (collectively, "312") and/or one or more embossed portions 314*a-b* (collectively, "314"). Embossed portion 314*b* illustrated in FIG. 1A may be employed for similar purposes with respect to one or more additional buttons on a consumer electronic device. Similarly, the apertures 312 may be employed to provide access to various components of the consumer electronic device such as audio, power, and data ports. Further, one of the apertures 312*c* may be configured to align with a camera lens of a consumer electronic device (not shown). In this regard, the aperture 312*c* may be oversized relative to the size of the camera lens in order to ensure that the camera lens is not blocked even when the consumer electronic device is not perfectly aligned in the rear cover 300. In one embodiment, apertures 312 can be punched into a thermoplastic shell that provides structure to accessory unit 100. A liquid crystal polymer fiber can be added around apertures 312 to reinforce apertures 312. In one specific embodiment, a 70 micron thick layer of liquid crystal polymer fiber can be utilized to provide durability to apertures 312. One specific type of liquid crystal polymer fiber that can be utilized for such a purpose is Vectran® fiber.

The lip portion 304, including lip portions 304*a-d* as shown in FIG. 1A, can be integrally formed with the recessed portion 302 and extend about an opening 316 of the chamber 310. It should be noted that in alternate embodiments lip portion 304 can be a separate rigid frame member in contact with recessed portion 302. As will be described in further detail below, the recessed portion 302 of the rear cover 300 may be formed from a flexible material. Additionally, the lip portion 304 may be formed from a material that is more rigid than the flexible material of the recessed portion 302. In this regard, the lip portion 304 of the rear cover 300 may be configured to retain a consumer electronic device in the chamber 310, as discussed in detail below. In some embodiments, the rigidness of lip portion 304 can be due substantially to a thickness of lip portion 304 with respect to recessed portion 302.

Figure 2A:
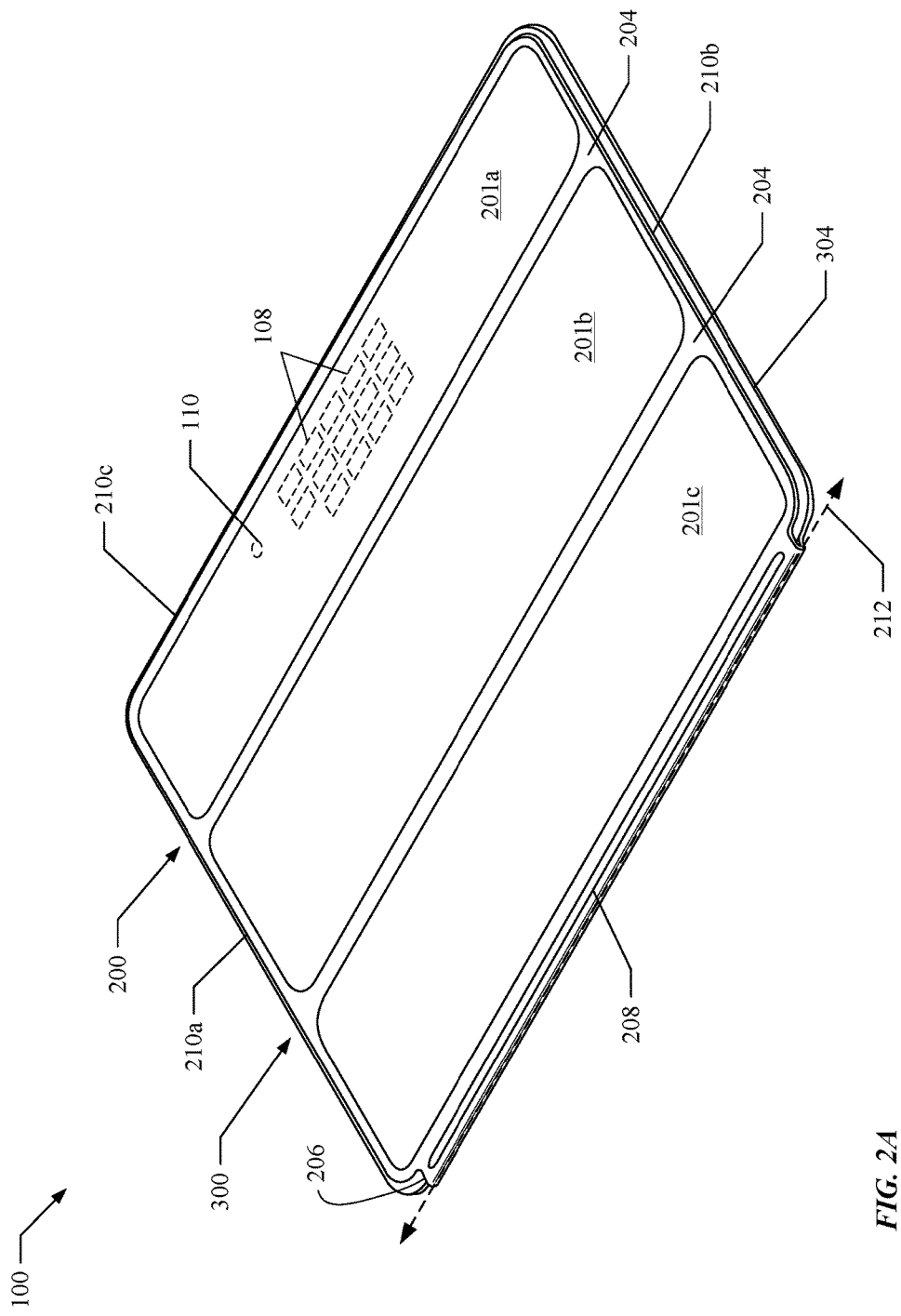
FIG. 2A illustrates a perspective view of the accessory unit of FIG. 1A with the front flap in a closed configuration.
Figure 2B:
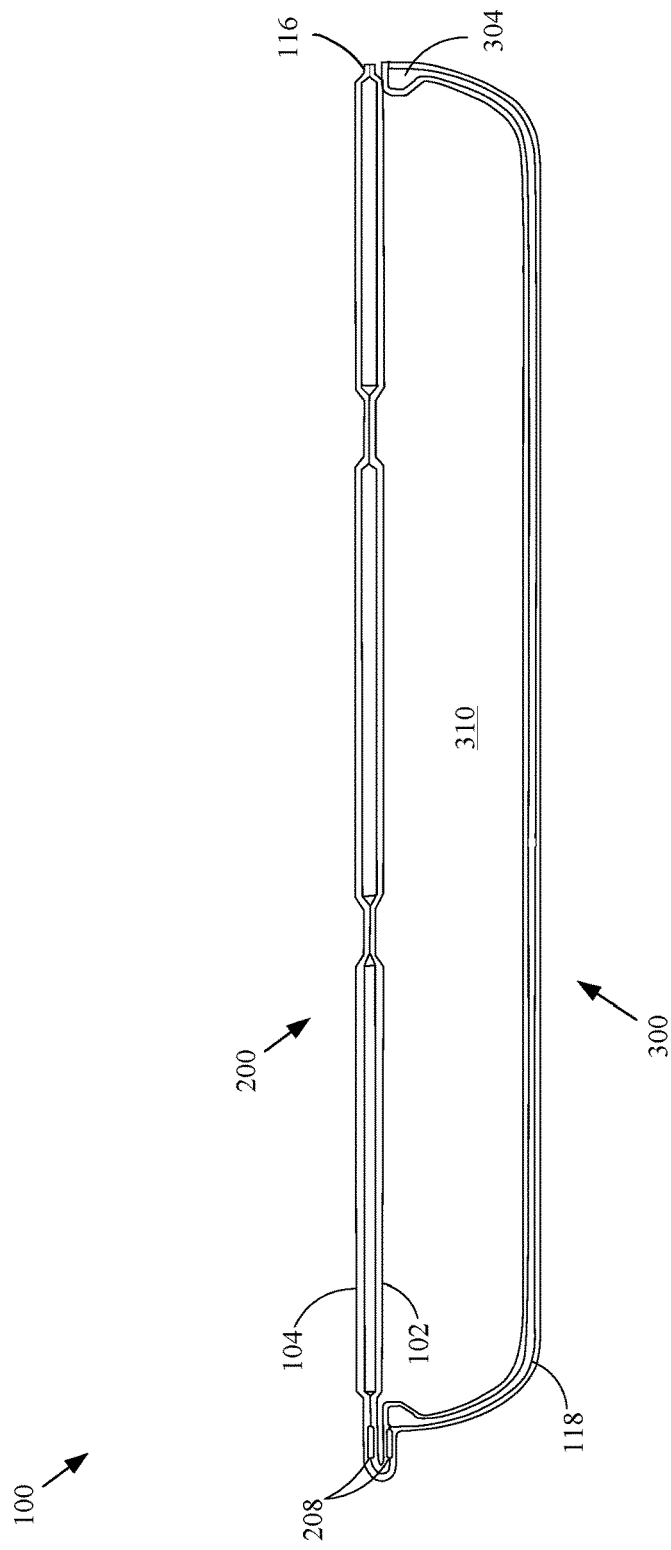
FIG. 2B illustrates a cross sectional view of the accessory unit of FIG. 2A with the front flap in a closed configuration.

As illustrated in FIG. 2A, outer edges 210 of front flap 200 may contact lip portion 304 when the front flap 200 is in the closed configuration. Accordingly, front flap 200 may define a substantially linear configuration when moved to the closed configuration. In this regard, end panels 208 can be substantially coplanar with the other segments 201*a*, 201*b*, 201*c* and the folding regions 204 of the front flap 200 when the front flap 200 is in the closed (or folded) configuration. However, a portion of end region 206 adjacent the end panels 208 bends to enable the end region 206 to function as a hinge, as noted above.

In some embodiments, as illustrated in FIG. 2A, lip portion 304 may extend outwardly beyond the outer edges 210 of front flap 200. In this regard, lip portion 304 may function to protect a consumer electronic device received in the chamber 310 in rear cover 300 from damage to the edges of the consumer electronic device when dropped or otherwise subjected to impact. However, in other embodiments, the outer edges 210 of the front flap 200 and the lip portion 304 may extend to the same dimensions, or the outer edges 210 of the front flap 200 may extend beyond the lip portion 304. When used as a structural element, lip portion 304 includes material having mechanical properties sufficient to retain the consumer electronic device within chamber 310 of rear cover 300. Moreover, in addition to the ability to retain the consumer electronic product within chamber 310, lip portion 304 also retains enough flexibility to allow the consumer electronic device to be inserted and removed from chamber 310 numerous times without undue exertion by an end-user, a potentially damaged accessory unit 100, or the consumer electronic device.

The material(s) defining the accessory unit 100 may vary. In one embodiment, the entire accessory unit 100 may be formed from a single material. However, as noted above, in other embodiments, it may be desirable to form the accessory unit 100 from multiple materials to take advantage of differing material properties.

Accessory unit 100 may further include one or more magnetic elements 108 in front flap 200. For example, magnetic elements 108 disposed within segment 201*a* can be configured to interact with an attachment feature of a consumer electronic device positioned within rear cover 300. Magnetic elements 108 can be magnetically attracted to the attachment feature of the consumer electronic device when accessory unit 100 is in a closed configuration such that the front flap 200 is releasably retained in this configuration. The front flap 200 may further include a magnetic element 110 configured to interact with a magnetically sensitive circuit embedded in the consumer electronic device configured to detect the presence, absence, or change from presence to absence, or vice versa, of the magnetic element 110. For example, the magnetically sensitive circuit may include a Hall Effect sensor.

Magnetic elements 108 and 110 of accessory unit 100 can be configured to provide various other types of functionality. For example, the Hall Effect sensor can respond to the presence (or absence) of the magnetic field by generating a signal. The signal can be used to alter an operating state of the consumer electronic device. Magnetic element 110 can be positioned on front flap 200 in a location that triggers the Hall Effect sensor to generate the signal when the cover is placed on or in proximity to a surface of the consumer electronic device. The signal can indicate that the front flap 200 is in a predetermined position relative to the consumer electronic device that can result in a change in an operating state of the consumer electronic device. The signal can also be used to alter the operating state to a state having functionality suitable for the consumer electronic device being fully covered.

In situations where the consumer electronic device includes a display, the functioning of the consumer electronic product can be altered in such a way that the display is prevented from displaying visual content. On the other hand, when the portion of front flap 200 having magnetic element 110 is removed to the point where the Hall Effect sensor no longer senses the magnetic field of magnetic element 110, then the Hall Effect sensor can generate another signal. This other signal can result in the consumer electronic device entering a different operating state consistent with at least a portion of the display being uncovered and viewable. In this state, the functionality of the tablet computer can be altered such that the display is enabled to present visual content. It should be noted that the above described attachment feature, and the magnetically sensitive circuit are discussed in U.S. Patent Application entitled, "CONSUMER ELECTRONIC PRODUCT" by Lauder et al. filed Dec. 17, 2010 having application Ser. No. 12/971,536, now U.S. Pat. No. 8,344,836, which is incorporated herein by reference in its entirety.

FIG. 2B shows accessory unit 100 in a closed configuration. Further, in other embodiments, rear cover 300 could be made with an adhesively formed base material, or alternative, rear cover could simply be an inner layer adhesively attached to an outer layer. In the embodiment shown in FIG. 2B, rear cover 300 includes shell 118. Shell 118 may be formed by a thermoforming process using plastic, compression molding, injection molding, or a combination thereof. Shell 118 could be made from any rigid material known in the art for making a case for an electronic housing device. In addition to shell 118, rear cover 300 includes inner layer 102 is attached to an inner surface of shell 118, and outer layer 104 is also attached to shell 118. As shown FIG. 2B, inner layer 102 and outer layer 104 generally terminate at one end near lip portion 304 of rear cover. Inner layer 102 and outer layer 104 extend through rear cover 300 to define an outer periphery of front flap 200. Inner layer 102 and outer layer 104 generally terminate at another end near reinforcement element 116. In some embodiment, reinforcement element 116 can be formed from a relatively rigid material such as plastic, steel, carbon fiber, fiberglass, etc. In the embodiment shown in FIG. 2B, reinforcement element 116 includes an adhesive disposed between inner layer 102 and outer layer 104.

Figure 3A:
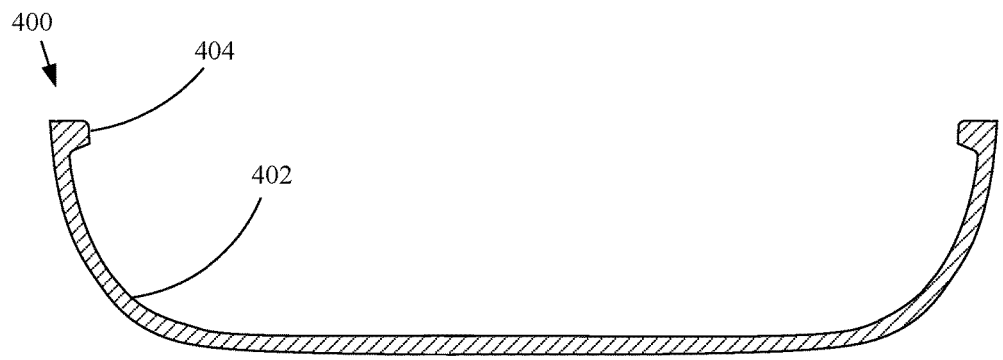
FIGS. 3A-3C illustrate cross-sectional side views various embodiments of shells.
Figure 3B:
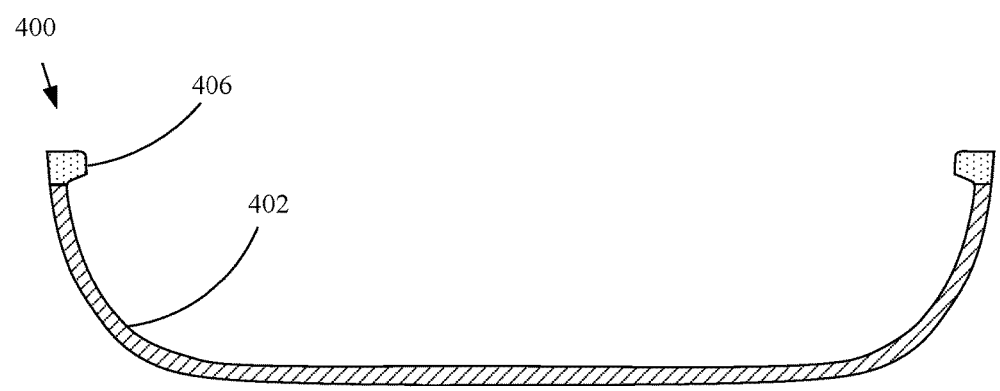
Figure 3C:

FIGS. 3A-3G show a process for forming rear cover portion of an accessory unit 100. For simplicity, this set of figures omits front flap 200. FIGS. 3A-3C show various embodiments of shell 400. In FIG. 3A, a thermoformed plastic shell 400 made of a single material is depicted. A recessed portion 402 of shell 400 can have a substantially uniform thickness, while a lip portion 404 can be integrally formed with recessed portion 402. Lip portion 404 can be injection molded on to recessed portion 402, thereby removing any need for a subsequent bonding operation. In another embodiment shown in FIG. 3B, plastic recessed portion 402 is compression molded to a lip portion 406. In some embodiments, lip portion 406 is made from reinforced glass fiber. Lip portion 406 can be constructed by overlaying a number of unidirectional glass fibers in a continuous loop and then forming them in accordance with a geometry of lip portion 406. In FIG. 3C, lip portion 406 also includes a substantial portion of sidewalls and accordingly, forms a substantial portion of the recessed portion of shell 400. Portions of a shell 400 that include reinforced material (such as reinforced glass fiber) can substantially add to an overall stiffness of shell 400.

Figure 3D:
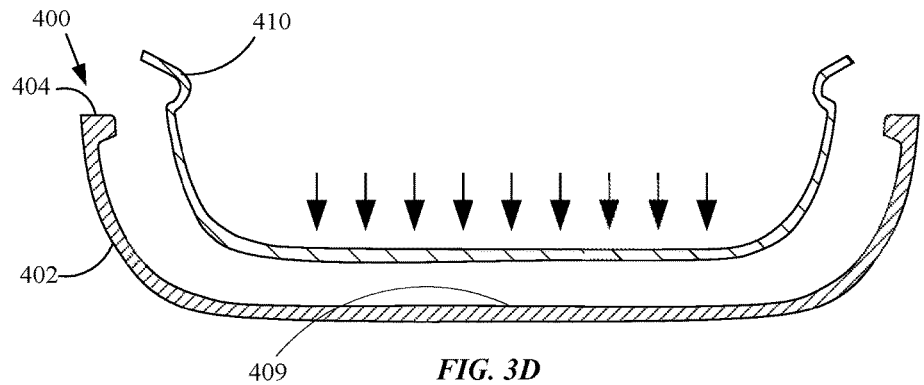
FIGS. 3D-3G illustrate cross-sectional side views schematically showing a method for forming a rear cover portion of an accessory unit.
Figure 3E:
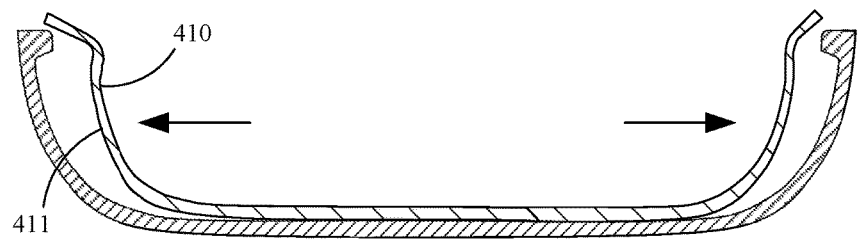

FIG. 3D shows a first assembly step, which depicts shell 400 as depicted in FIG. 3A and a first layer 410 (which may also be referred to as an inner layer). In some embodiments, shell 400 can be a thermoformed plastic shell, a compression molded shell, an injection molded shell, or a combination thereof. In some embodiments, first layer 410 is a microfiber layer; microfiber layer could further be a preformed microfiber layer. It should be understood that the embodiments shown in FIGS. 3B and 3C could also be used in the assembly steps shown in FIGS. 3D-3G. First layer 410 can be a preformed microfiber layer. First layer 410 can be adhesively coupled to a central portion 409 of recessed portion 402. In one embodiment, first layer 410 can be adhesively coupled to shell 400 by a thermoplastic adhesive, while in other embodiments a thermosetting adhesive can be utilized. In both cases, shell 400 and first layer 410 can be heated to activate the thermal adhesive. FIG. 3E shows a second step in which an expanding device is used to press peripheral portions 411 of first layer 410 around a lip portion 404 of shell 400, thereby adhesively engaging the peripheral portions of first layer 410 about lip portion 404 and along sidewalls of shell 400. Because first layer 410 is preformed to conform with an inside surface of shell 400, undue stretching of first layer 410 can be controlled and avoided. In this way, pin holes can be prevented from forming in first layer 410, thereby preventing adhesive and/or a portion of shell 400 from showing through first layer 410.

Figure 3F:
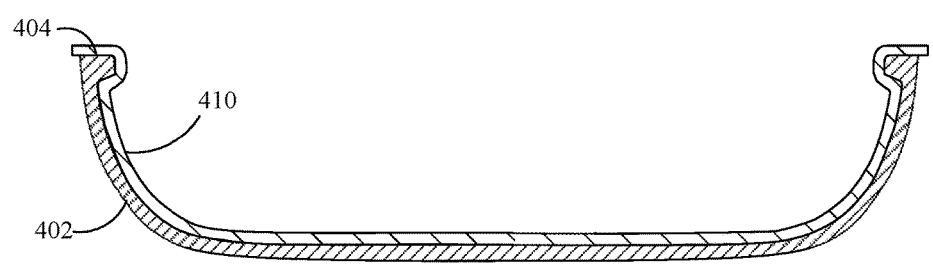
Figure 3G:
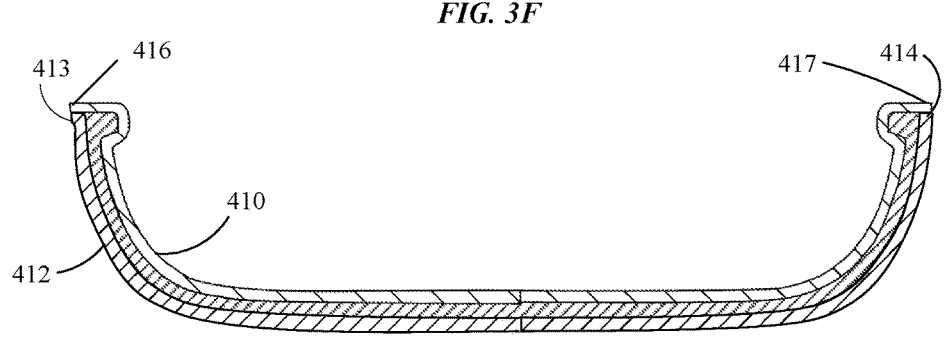

In FIG. 3F, once first layer 410 is in adhesive contact with shell 400 and while an expanding device (not shown) keeps the first layer 410 under tension, an exposed portion of shell 400 can be cooled at a controlled rate to establish desired characteristics in an adhesive coupling between first layer 410 and shell 400. For example, in some embodiments, cooling can be varied to provide varying stiffness across recessed portion 402 and/or lip portion 404. In FIG. 3G, second layer 412 (also referred to as an outer layer) can be adhesively coupled to an exposed portion of shell 400. Second layer 412 could be made of leather. In one embodiment, the adhesive coupling can be accomplished using a concave fixture to press second layer 412 against shell 400. First end 413 and second end 414 of second layer 412 can be coupled to first end 416 and second end 417, respectively, of first layer 410. First layer 410 and second layer 412 can come together to form a substantially zero flange design. The phrase "zero flange design" refers to a bonded region of first layer 410 and second layer 412 that free of outward protrusion (with respect to shell 400) of first layer 410 or second layer 412. In other words, the region where first layer 410 is bonded to second layer 412 extends from shell 400 a distance approximately similar to a thickness (width) of first layer 410 or second layer 412). The zero flange design further maintains the bonded relationship between first layer 410 and second layer 412. An example of zero flange design is shown where second end 414 of second layer 412 bonds with first layer 410. In some embodiments, a slight flange can be formed to increase surface area between the two layers, thereby improving adhesion. It should be noted that ideal fit and finish of accessory unit 100 is accomplished by tuning an amount of stretch in both first layer 410 and second layer 412. Also, the adhesive may be cured by, for example, radiation (from a light source such as ultraviolet (UV) light) and/or a time lapse sufficient for the adhesive to bond first layer 410 and second layer 412 to shell 400. Other cooling means are further discussed below.

Figure 4A:
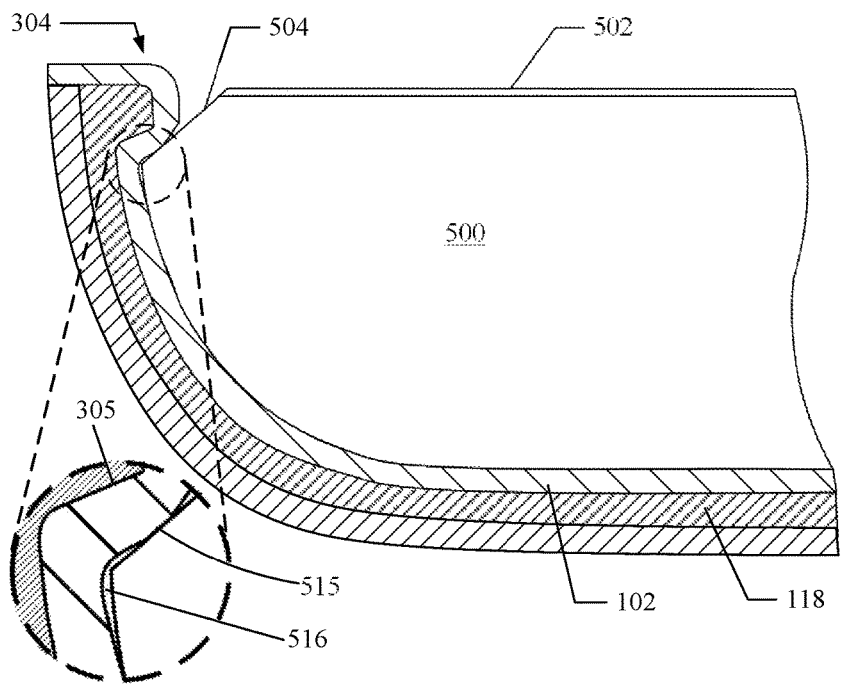
FIGS. 4A-4D illustrate a side cross sectional views showing various features relating to sidewalls of an accessory unit.

FIG. 4A shows a cross sectional view of a sidewall of rear cover 300 having consumer electronic device 500 disposed therein. This view shows how lip portion 304 can act via interference fit to retain consumer electronic device 500 in chamber 310. When consumer electronic device 500 is inserted into rear cover 300, lip portion 304 extends outward in a direction away from consumer electronic device 500, then retracts to the original (resting) position once consumer electronic device 500 is fully received by the rear cover 300. The interference fit can cause consumer electronic device 500 to snap into place within accessory unit 100 due to a geometry of lip portion 304 not conforming precisely to an outer surface of consumer electronic device 500. In other words, the curvature of rear cover 300 may not completely correspond to the curvature of electronic device. FIG. 4A further illustrates a close-up showing relationship between lip portion 304 and chamfered portion 504 of electronic device 500. Here, engaging region 515 of the inner layer 102 contacts consumer electronic device 500. However, edge 305 of lip portion 304 is angled such that inner layer 102 does not contact consumer electronic device 500. The area is shown as disengaging region 516. Such a configuration contributes to the snap effect during inserting and extracting consumer electronic device 500 from accessory unit 100. It should be understood this relationship between extends around the perimeter of the lip portion 304 and consumer electronic device 500.

This feature allows a user to have affirmative confirmation (for example, by hearing a "snap") that consumer electronic device 500 is secured within accessory unit 100, or when consumer electronic device 500 is released/removed from accessory unit 100. Also, lip portion 304 can avoid contacting display cover glass 502. This allows all of display cover glass 502 to remain visible, which may be desirable in embodiments in which consumer electronic device 500 includes a display that extends near the edges of the top surface consumer electronic device 500.

In particular, the curvature of rear cover 300 may not completely correspond to the curvature of electronic device. For example, FIG. 4A illustrates a close-up of the relationship between lip portion 304 and chamfered portion 504 of electronic device 500. Here, engaging region 515 of the inner layer 102 contacts electronic device 500. However, a lower section of lip portion 304 is angled such that inner layer 102 does not contact electronic device 500. The area is shown as disengaging region 516. Such a configuration contributes to the snap effect of inserting and extracting electronic device 500 from accessory unit 100. It should be understood this relationship between extends around the perimeter of the lip portion 304 and electronic device 500.

Figure 4B:
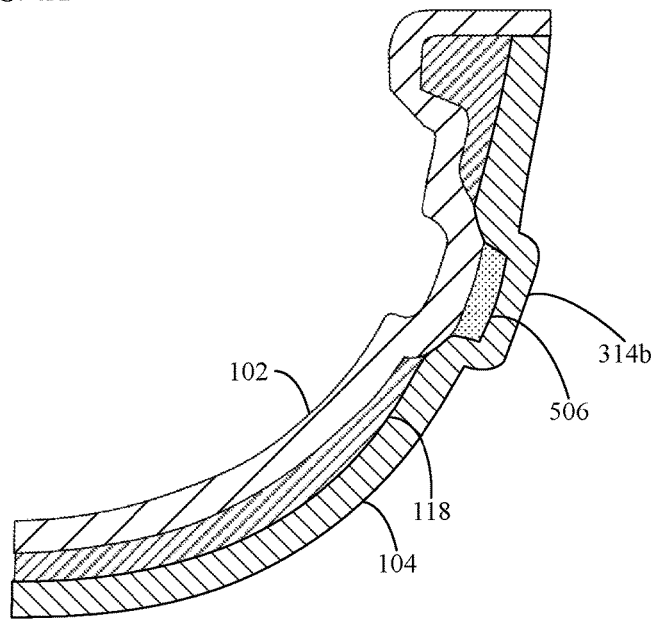

FIG. 4B shows a cross sectional view of a sidewall of rear cover 300 that includes embossed portion 314*b*. A tactile feel of embossed portion 314*b* can be enhanced by adding a filling member 506 suspended between inner layer 102 and outer layer 104. Filling member 506 could include a plastic member other or a more flexible member such as silicone. In the embodiment shown in FIG. 4B, embossed portion 314*b* can correspond to a volume control of an electronic device. A portion of shell 118 has been removed to allow user interaction with the volume control. In this way filling member 506 can provide a strong tactile feeling to a user manipulating the volume control. Inner layer 102 and outer layer 104 can cause filling member 506 to hover in position and provide resistance in response to a user actuation. In some embodiments, filling member 506 can be surrounded by low durometer rubber during an insert molding operation to provide additional spring/flexibility for actuation of the volume control. In other embodiments, additional tactile enhancements can be made. For example, a portion of outer layer 104 that engages filling member 506 can be made thinner so that there is less compressible material (e.g, less outer layer 104) when a user actuates the volume control. A treatment can be applied to the leather layer to adjust a hardness of the leather layer above filling member 506. A skiving method (discussed below) could also be used to remove a portion of outer layer 104.

Figure 4C:
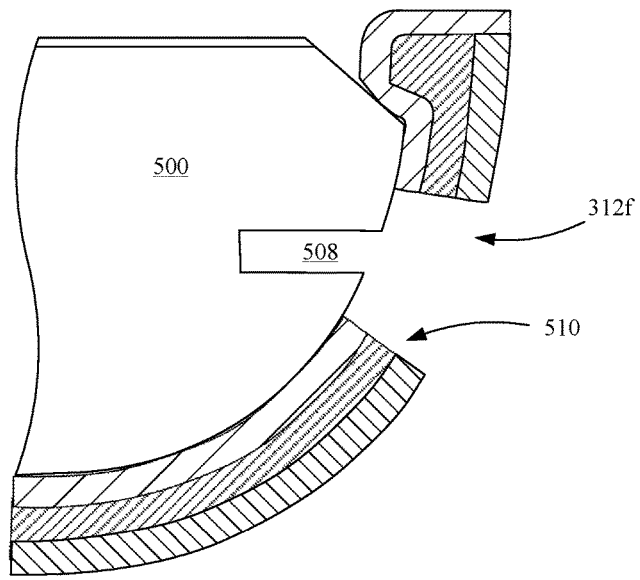
Figure 4D:
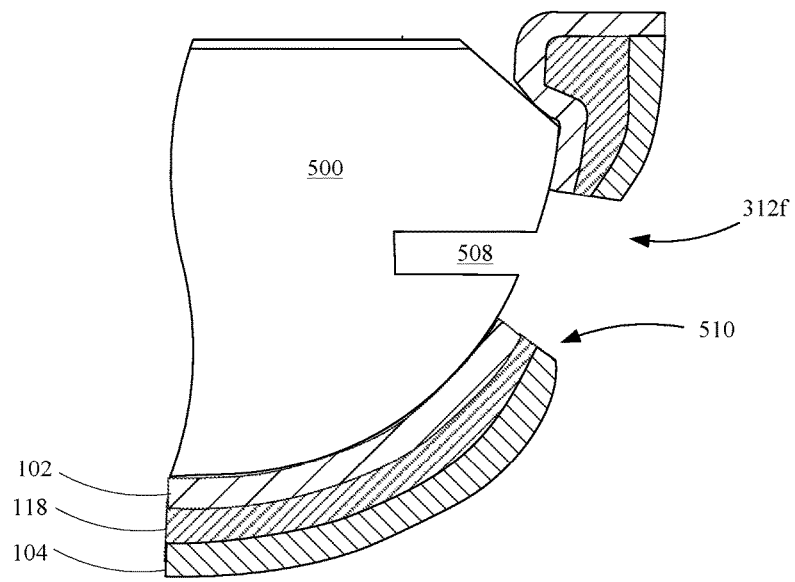

FIG. 4C shows a cross sectional side view of a sidewall or rear cover 300 that includes an aperture 312*f* for coupling a data cable to data port 508 of electronic device 500 disposed within accessory unit 100. Depending on the electronic device, aperture 312*f* could receive other members known in the art for coupling to an electronic device through an aperture of an accessory unit. Aperture 312*f* can have sidewalls 510 that extend normal from an outside surface of electronic device 500. When compared with an aperture cut in a direction substantially parallel to a top surface of electronic device 500, aperture 312*f* avoids sharp angles jutting out and having a higher potential of fraying or even interfering with use of data port 508. Rather, aperture 312, as shown in FIG. 4C, is cut such that the circular wall is normal to the surface of electronic device 500. This design leaves edges of aperture 312*f* less vulnerable to contact from external objects. While such an opening would normally require a three dimensional cutting path to be traced, a tapered cutter can be utilized to cut aperture 312*f* as depicted without complexities associated with a three dimensional cutting path. FIG. 4D shows another configuration of aperture 312*f*. In this embodiment, a debossed aperture 312*f* is depicted. Here, shell 118 is made thinner near aperture 312*f* to provide an appearance of accessory unit 100 having a narrower width. In some embodiments, shell 118 can end prior to aperture 312*f* such that only inner layer and outer layers remain at the edge of aperture 312*f*. In other embodiments, inner layer 102 can made thinner and/or end prior to aperture 312*f*.

It should be understood that the depicted techniques can be applied to any of apertures 312 as depicted in FIG. 1A. In contrast, apertures 312*e* (configured to audio from an electronic device to pass through accessory unit 100) can be formed using a different process. In one embodiment, apertures 312*e* can be drilled by a spindle head rotating at 80,000 rpm to create a substantially clean hole through rear cover 300. In other embodiments, a spiral shaped cutter can be used to form apertures 312*e*. The spiral shaped cutter can push chips towards a center portion of apertures 312*e*, thereby forming a clean cut.

FIGS. 5A-5E shows a series of illustrations describing a skiving method. Skiving can be applied by a skiving machine, to change characteristics of a fabric layer, and more specifically to change a material thickness of the fabric. A leather portion of front flap 200 may be too rigid along folding regions 204 (shown in FIGS. 1A-2A) for certain applications. This excessive rigidity may prohibit front flap 200 from easily folding to form a support structure. The skiving method offers a reliable method for removing material from front flap 200 to create, for example, folding regions 204.

Figure 5A:
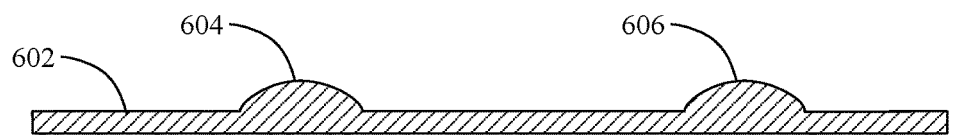
FIGS. 5A-5E illustrate cross sectional views showing a method for skiving a piece of fabric.
Figure 5B:
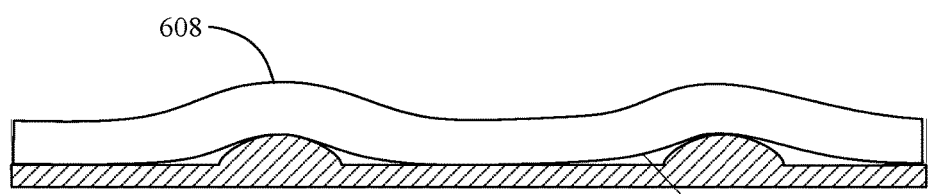
Figure 5C:
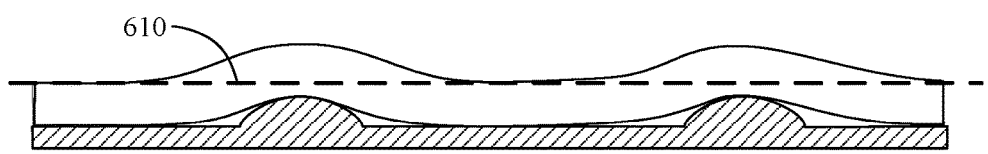
Figure 5D:
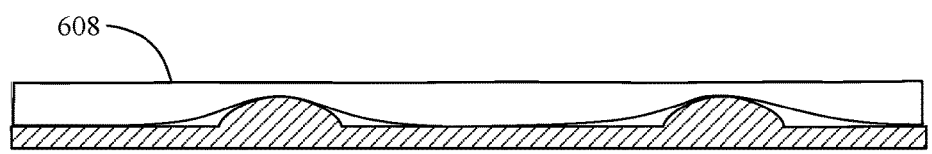
Figure 5E:
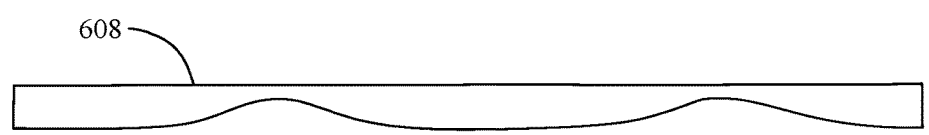

FIG. 5A shows a template 602 configured to establish a skiving pattern. In some embodiments template 602 can be made of plastic and can includes protrusions 604, 606 that determine where material is to be removed. Although protrusions 604, 606 are depicted as being substantially the same size and shape, other sizes and shapes are possible and can serve different purposes. In other embodiments, there could be at least three protrusions. In FIG. 5B, leather layer 608 is laid across template 602, with the cosmetic side 609 contacting template 602. By laying the cosmetic side 609 against template 602, subsequent cutting operations do not substantially affect an exterior finish of leather layer 608. In FIG. 5C a cutting operation is performed along cutting line 610. The cutting operation can be performed by a thin slicing blade that cuts parallel to a top surface of template 602. FIG. 5D shows leather layer 608 after the cutting operation. Because protrusions 604, 606 cause leather layer to curve gradually, a resulting thickness of leather layer 608 also varies gradually (corresponding to protrusions 604, 606) to provide a smooth thickness transition. Finally, FIG. 5E shows leather layer 608 removed from template 602. It should be noted that in addition to increasing flexibility in folding regions 204, this skiving method can be used to provide space to embed various items beneath leather layer 608. For example, flexible circuits, wiring, and even magnetic elements could be partially or completely hidden by such a technique.

Figure 6:
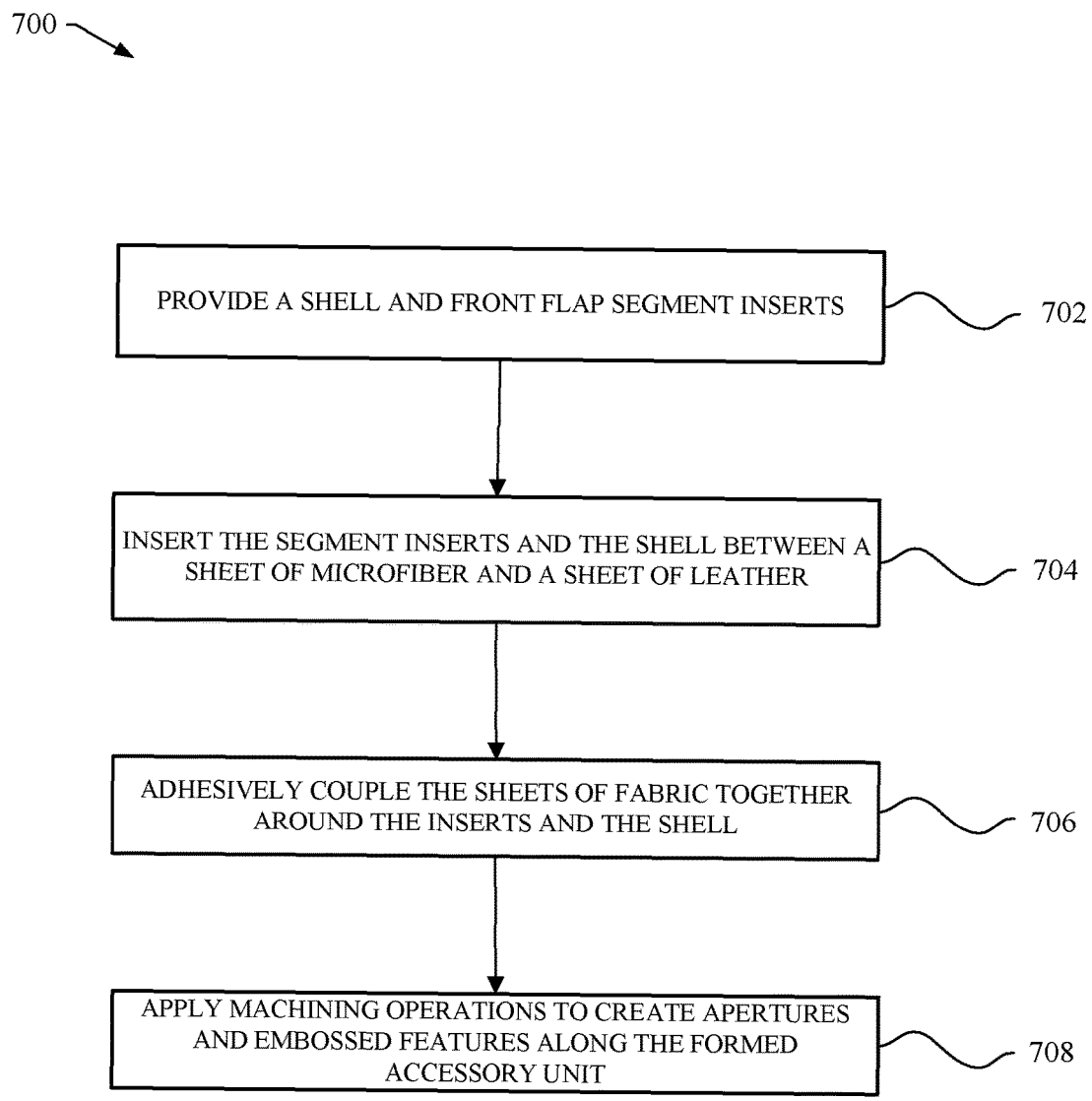
FIG. 6 illustrates a block diagram representing a method for assembling an accessory unit.

FIG. 6 shows a block diagram 700 illustrating a method for assembling an accessory unit. In a first step 702, a shell and front flap segment inserts are provided. In one embodiment the shell can be a thin walled thermoformed plastic shell and the segment inserts can be glass fiber. In other embodiments, the shell can be formed by compression molding, or a combination of thermoforming and compression molding. In step 704, the shell and front flap segment inserts can be positioned between an outer layer and an inner layer. Segment inserts may include magnetic elements, filling elements (such as a plastic piece or silicone), or a combination thereof. In some embodiments, magnetic elements are formed inside the segments inserts, and accordingly, are disposed between the inner layer and the outer layer in conjunction with the segment inserts.

In step 706, the outer layer and inner layer are adhesively coupled together around both the shell and the front flap segments. In some embodiments, a complex press can be utilized that seals the outer layer and inner layer around the shell and front flap in a single bonding (or laminating) operation. In other embodiments, the microfiber layer is first adhesively bonded to an inside surface of the shell. The adhesive bond can be established by a thermoplastic or thermosetting adhesive. One advantage of a thermosetting adhesive is that lower setting temperatures can be used and an applicator can be utilized to spread the adhesive at varying thicknesses thereby generating regions of greater and lesser rigidity. In addition, the leather layer is not subject to higher heat that is required to activate other adhesives.

Subsequent to bonding the microfiber layer to a bottom portion of the shell, a spreading element can be utilized to adhere peripheral portions to sidewalls of the shell, including a top side of a lip portion of the shell as well as the sidewalls of the shell. After the microfiber is pressed against the shell the shell, the shell can be cooled to cause the adhesive to properly set. Cooling means may include running coolant through the tool (spreading element), cooling the tool (which extracts heat from the microfiber/shell configuration), using air jets in the tool to push air onto the microfiber/shell configuration, switching out the heated tool with a cool tool, or a combination thereof. Next, the leather layer is adhered to an opposite side of the shell. Subsequently, the leather layer and microfiber seal around the front flap segment inserts and various other internal components of the accessory unit. In step 708, a machining operation can be applied to form apertures and embossments along a surface of the accessory unit to provide easy access to controls on a compatible consumer electronic product.

Figure 7A:
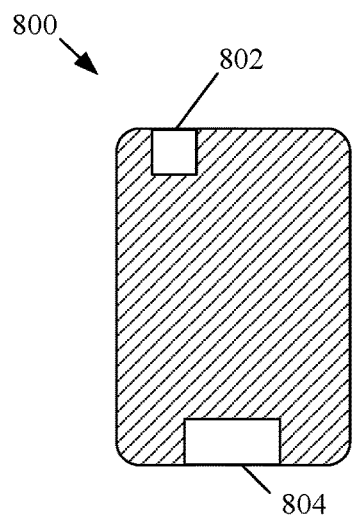
FIGS. 7A-7D illustrate various embodiments of hybrid shells suitable for use as a shell within an accessory unit.
Figure 7B:
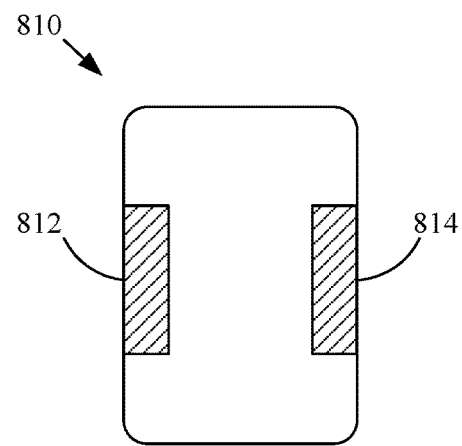
Figure 7C:
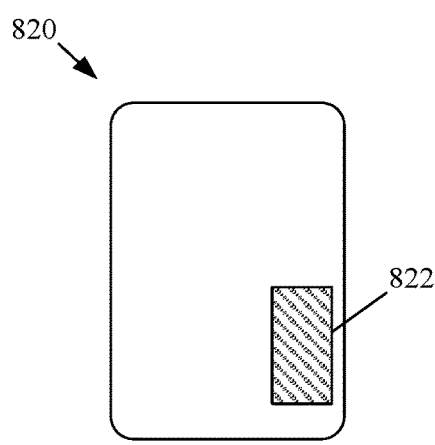
Figure 7D:
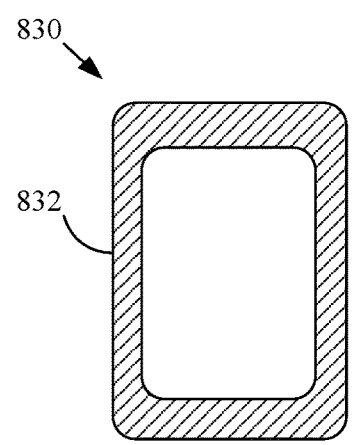

FIGS. 7A-7D show various alternative hybrid shell embodiments. The hybrid shell embodiments each include a shell formed by compression molding at least two different materials together. In this way different characteristics can be provided to different portions of the shell. Each of the following embodiments can be formed during a single compression molding operation. In FIG. 7A shell 800 is made from substantially stiff material such as glass fiber or a carbon fiber weave. Portions 802 and 804 can correspond to an input/output openings that can be areas of high strain. In this way the potential strain on the cover can be ameliorated. In FIG. 7B shell 810 is made from substantially flexible material, such as a thermoplastic. Regions 812 and 814 can correspond to edge areas to firm up a feel of the edge portions of the accessory unit. In some embodiments this can prevent the accessory unit from having a floppy edge feel. In other words, the accessory unit feels rigid and robust when held by a user. In FIG. 7C, shell 820 is made from a substantially flexible material and having an embedded attraction plate 822 made from a magnetically attractable material such as steel. By embedding attraction the plate 822 within shell 820, magnetic elements within the front flap can attract to the attraction plate 822, such that the front flap is secured to the shell 820 during, for example, use of an electronic device. FIG. 7D shows a shell 830 having a stiff outer periphery 832 that can be formed from, for example, glass fiber. Outer periphery 832 can include both a lip portion of shell 830 and at least sidewalls of shell 830, such that a protected electronic device is firmly seated within the accessory unit. The shells described in FIGS. 7A-D may include an outer layer (such as leather) disposed on an outer surface of the shell. It should be understood that the outer layer is sufficiently thin and/or the magnetic attraction is sufficiently strong such that front flap attracts to shell.

Indicia, such as a logo or symbol, may be disposed on the front flap and/or the rear cover. Indicia can be formed by removing a portion of a surface of the leather layer corresponding to a shape of the logo. Unfortunately, the consistency or uniformity of an underlying layer of leather can vary in accordance with a grain or other individual characteristic of the leather. To compensation, in some embodiments, the underlying layer can be treated with water or steam to provide a particular color for the indicia. Variations in temperature, time and/or operating pressure can affect the color or colors obtained. To further create indicia with a more uniform appearance, a dye or ink can be applied to the indicia.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An accessory device for use with an electronic device, the accessory device comprising:
   a chamber having a size and shape to receive the electronic device, the chamber comprising a sidewall;
   a first layer covering a first surface of the chamber;
   a second layer covering a second surface of the chamber, the second surface opposite the first surface, wherein the first layer and the second layer extend beyond the chamber to define a front flap having a size and shape to cover the chamber, the front flap rotatable with respect to the chamber; and
   a hinge that extends along the sidewall, the hinge comprising a first panel and a second panel positioned between the first layer and the second layer, wherein the first panel and the second panel provide a support such that the front flap maintains an alignment with the chamber.

2. The accessory device of claim 1, further comprising a through hole formed through the chamber, the first layer, and the second layer.

3. The accessory device of claim 2, wherein the second layer comprises a first thickness, and wherein, at a location surrounding the through hole, altering the second layer to a second thickness less than first thickness.

4. The accessory device of claim 1, wherein the chamber comprises a shell positioned between the first layer and the second layer.

5. The accessory device of claim 4, wherein the shell comprises a lip portion extending in a direction toward the chamber.

6. The accessory device of claim 2, wherein plastic material:
   the first panel comprises a first magnetic panel,
   the second panel comprises a second magnetic panel, and the first magnetic panel magnetically couples with the second magnetic panel when the front flap is folded onto the chamber.

7. An accessory device for an electronic device that includes a user interface, the accessory device comprising:
a chamber comprising:
a polycarbonate shell comprising a bottom wall and sidewalls that combine with the bottom wall to form an internal volume having a size and shape to receive the electronic device, the bottom wall and the sidewalls defining a first surface and a second surface opposite the first surface;
a first layer that fully covers the first surface;
a second layer that fully covers the second surface; and
a through hole formed in the chamber and aligned with the user interface when the electronic device is in the chamber, the through hole comprising:
a first opening in the first layer;
a second opening in the second layer; and
a third opening in the polycarbonate shell, the first opening being concentric with the second opening and the third opening.

8. The accessory device of claim 7, wherein:
the chamber comprises a rear wall and a magnetic attraction plate embedded in the rear wall,
the first layer and the second layer form a front flap that carries a magnetic element, and
the front flap remains engaged by a magnetic circuit formed by the magnetic attraction plate and the magnetic element.

9. The accessory device of claim 7, further comprises a lip portion formed on the polycarbonate shell.

10. The accessory device of claim 7, wherein the first layer and the second layer combined to form a front flap that extends from the chamber, the front flap connected with the chamber by a hinges that allows the front flap to pivot relative to the chamber.

11. The accessory device of claim 10, further comprising:
a first panel; and
a second panel, wherein the first panel and the second panel provide a support such that the front flap maintains an alignment with the chamber.

12. The accessory device of claim 7, wherein the first layer comprises a microfiber, and wherein the second layer comprises leather or silicone.

13. The accessory device of claim 7, wherein the second layer is tapered at a location corresponding to the through hole.

14. A method for making a case for an electronic device, the method comprising:
covering a first surface of a shell with a first layer, the shell having a size and shape to receive the electronic device, the shell further comprising a sidewall;
covering a second surface with a second layer, the second surface opposite the first surface, wherein the first layer and the second layer extend beyond the shell to define a front flap having a size and shape to cover the shell, the front flap rotatable with respect to the shell;
forming a hinge that extends along the sidewall; and
embedding a first panel and a second panel between the first layer and the second layer at a location corresponding to the hinge, wherein the first panel and the second panel provide a support such that the front flap maintains an alignment with the shell.

15. The method of claim 14, wherein the first layer, the second layer and the shell combine to define a chamber, and wherein the method further comprises:
forming a through hole in the chamber aligned, the through hole comprising:
a first opening in the first layer;
a second opening in the second layer; and
a third opening in the shell, the first opening being concentric with the second opening and the third opening.

16. The method of claim 15, wherein the second layer comprises a first thickness, and wherein the method further comprises, at a location surrounding the through hole, altering the second layer to a second thickness different from the first thickness.

17. The method of claim 16, wherein the second thickness is less than the first thickness.

18. The method of claim 14, further comprising forming a lip portion around an edge of the shell, wherein the shell comprises a first material, and wherein the lip portion comprises a second material different from the first material.

19. The method of claim 18, wherein the slip provides a snap fit for the electronic device.

20. The method of claim 14, embedding the first panel and the second panel comprises the first panel comprises embedding a first magnetic panel and a second magnetic panel, wherein the first magnetic panel magnetically couples with the second magnetic panel when the front flap is folded onto the shell.

* * * * *